(12) United States Patent
Vinezeano et al.

(10) Patent No.: US 12,273,182 B2
(45) Date of Patent: Apr. 8, 2025

(54) FREQUENCY CONVERSION SYSTEM

(71) Applicant: KRATOS ANTENNA SOLUTIONS CORPORATION, Plano, TX (US)

(72) Inventors: Frederick Carmen Vinezeano, Plano, TX (US); Gary Daniel Vorderbrueggen, Plano, TX (US); Douglas Alan Gribben, Plano, TX (US)

(73) Assignee: KRATOS ANTENNA SOLUTIONS CORPORATION, Plano, TX (US)

( * ) Notice: Subject to any disclaimer, the term of this patent is extended or adjusted under 35 U.S.C. 154(b) by 0 days.

(21) Appl. No.: 18/952,308

(22) Filed: Nov. 19, 2024

(65) Prior Publication Data

US 2025/0080210 A1 Mar. 6, 2025

Related U.S. Application Data

(63) Continuation of application No. PCT/US2023/026488, filed on Jun. 28, 2023.

(60) Provisional application No. 63/393,601, filed on Jul. 29, 2022.

(51) Int. Cl.
*H04B 7/185* (2006.01)
*H04W 88/16* (2009.01)

(52) U.S. Cl.
CPC ......... *H04B 7/18513* (2013.01); *H04W 88/16* (2013.01)

(58) Field of Classification Search
CPC ........................... H04B 7/18513; H04W 88/16
See application file for complete search history.

(56) References Cited

U.S. PATENT DOCUMENTS

| 8,220,038 B1 * | 7/2012 | Lucchesi ............... H04L 63/105 |
| | | 726/4 |
| 2007/0217325 A1 | 9/2007 | Geile et al. |
| 2007/0256991 A1 * | 11/2007 | Philips ................. H05K 7/1425 |
| | | 211/26 |
| 2009/0166404 A1 | 7/2009 | German et al. |
| 2010/0171550 A1 | 7/2010 | Pitsch et al. |

(Continued)

FOREIGN PATENT DOCUMENTS

| EP | 3482570 B1 | 5/2019 |
| EP | 4373125 A2 | 5/2024 |

(Continued)

OTHER PUBLICATIONS

International Search Report and Written Opinion for PCT/2023/026488, Mailed on Sep. 28, 2023, 10 pages.

(Continued)

*Primary Examiner* — Raymond S Dean
(74) *Attorney, Agent, or Firm* — Procopio, Cory, Hargreaves & Savitch LLP

(57) ABSTRACT

The antenna hub of a satellite gateway has limited space. Existing frequency conversion utilize bulky components that consume significant space and are costly to maintain in terms of complexity, time, and expense. Accordingly, a compact and flexible frequency conversion system is disclosed. This frequency conversion system consumes less space, provides built-in automated software-controlled configurability and redundancy, and provides easy replaceability at both a channel level and a device level.

21 Claims, 7 Drawing Sheets

(56) References Cited

U.S. PATENT DOCUMENTS

| | | | |
|---|---|---|---|
| 2012/0076003 A1 | 3/2012 | Wong | |
| 2012/0112625 A1* | 5/2012 | Kato | H01J 31/15 313/496 |
| 2014/0334118 A1 | 11/2014 | Neumann et al. | |
| 2015/0244624 A1* | 8/2015 | Asiano | H04B 7/155 370/235 |
| 2016/0037505 A1* | 2/2016 | Cooklev | H04W 84/20 370/329 |
| 2016/0065136 A1 | 3/2016 | Phelps et al. | |
| 2024/0015210 A1 | 1/2024 | Bayer et al. | |
| 2024/0037050 A1* | 2/2024 | Bayar | H04Q 1/136 |

FOREIGN PATENT DOCUMENTS

| | | |
|---|---|---|
| GB | 2604345 A | 9/2022 |
| GB | 2605093 A | 9/2022 |
| WO | 2022184658 A1 | 9/2022 |

OTHER PUBLICATIONS

International Search Report for PCT/EP2022/055019, ISA/EPO, Mailed on May 7, 2022, 3pgs.

* cited by examiner

FREQUENCY CONVERSION SYSTEM

CROSS-REFERENCE TO RELATED APPLICATIONS

This application claims priority to International App. No. PCT/US2023/026488, filed on Jun. 28, 2023, which claims priority to U.S. Provisional Patent App. No. 63/393,601, filed on Jul. 29, 2022, which is hereby incorporated herein by reference as if set forth in full.

BACKGROUND

Field of the Invention

The embodiments described herein are generally directed to satellite communications, and, more particularly, to a frequency conversion system in the gateway for satellite communications.

Description of the Related Art

With the advent of more numerous and complicated extremely high frequency (EHF) satellite gateways, there is an innate requirement that the active radio frequency (RF) subsystems be collocated as close to the antenna feed combiner network as possible. This requirement has increased the demand and competition for the very limited space in the antenna hub that houses these subsystems. Thus, it would be advantageous to reduce the amount of space consumed by the active RF subsystems.

SUMMARY

Accordingly, a compact frequency conversion system is disclosed. The compactness of the disclosed frequency conversion system enables collocation of frequency conversion close to the antenna feed combiner network.

In an embodiment, a frequency conversion system comprises: a chassis with a plurality of slots, wherein each of the plurality of slots is configured to receive a frequency conversion unit, and wherein each frequency conversion unit is configured to convert a signal from a first frequency band to a second frequency band using at least one software-configurable local oscillator; and a controller configured to for each frequency conversion unit in the plurality of slots, configure the first frequency band and the second frequency band of the frequency conversion unit, switch the frequency conversion unit between an online mode and an offline mode, and monitor the operation of the frequency conversion unit to detect a failure of the frequency conversion unit, and when detecting the failure of a first frequency conversion unit in the online mode, configure a second frequency conversion unit in the offline mode to match a configuration of the first frequency conversion unit, and switch the second frequency conversion unit to the online mode, while switching the first frequency conversion unit to the offline mode.

The chassis may comprise a front-plane, and the plurality of slots may be through the front-plane. The chassis may comprise two pull bars on opposing sides of the front-plane.

Each of the plurality of slots may have identical dimensions to each of the other plurality of slots.

The frequency conversion system may further comprise a plurality of the frequency conversion units, wherein each of the plurality of frequency conversion units is mounted within a respective one of the plurality of slots. Each of the plurality of frequency conversion units may have an identical form factor as each of the other plurality of frequency conversion units.

The frequency conversion system may further comprise a connection matrix that is configured to provide an any-to-any connection between one or more inputs of the frequency conversion system and an input of each of the plurality of frequency conversion units, and between one or more outputs of the frequency conversion system and an output of each of the plurality of frequency conversion units. The controller may be further configured to control the connection matrix to connect any of the one or more inputs of the frequency conversion system to the input of any one of the plurality of frequency conversion units, and connect any of the one or more outputs of the frequency conversion system to the output of any one of the plurality of frequency conversion units.

The frequency conversion system may further comprise a shared power supply, wherein the shared power supply is configured to provide power to all of the plurality of frequency conversion units in the plurality of slots.

The plurality of frequency conversion units may comprise two or more block downconverter (BDC) units that each down-converts an input signal at a first frequency into an output signal at a second frequency, wherein the second frequency is lower than the first frequency.

The plurality of frequency conversion units may comprise two or more block upconverter (BUC) units that each up-converts an input signal at a first frequency into an output signal at a second frequency, wherein the second frequency is higher than the first frequency.

The plurality of frequency conversion units may comprise: two or more block downconverter (BDC) units that each down-converts an input signal at a first frequency into an output signal at a second frequency, wherein the second frequency is lower than the first frequency; and two or more block upconverter (BUC) units that each up-converts an input signal at a third frequency into an output signal at a fourth frequency, wherein the fourth frequency is higher than the third frequency.

Each of the plurality of frequency conversion units may be removable from the respective slot.

The frequency conversion units may be arranged into one or more logical groups, wherein the controller implements M:N redundancy for each of the one or more logical groups by, for each of the one or more logical groups, for each N frequency conversion units in the logical group that are in the online mode, maintaining M frequency conversion units in the logical group in the offline mode. The controller may be configured to maintain at least one of the M frequency conversion units as active for use as a hot spare. In each of the one or more logical groups, each of the N frequency conversion units in the logical group may perform frequency conversion for a different sub-band of an extremely high frequency (EHF) band.

The frequency conversion system may further comprise a plurality of the frequency conversion units, wherein each of the plurality of frequency conversion units is mounted within a respective one of the plurality of slots, and wherein the one or more logical groups are at least two logical groups.

A first one of the two logical groups may comprise a plurality of block downconverter (BDC) units as the frequency conversion units, and a second one of the two logical groups may comprise a plurality of block upconverter (BUC) units as the frequency conversion units.

A first one of the two logical groups may comprise a plurality of block downconverter (BDC) units as the frequency conversion units, configured for a first polarization sense, and a second one of the two logical groups may comprise a plurality of block downconverter (BDC) units as the frequency conversion units, configured for a second polarization sense that is opposite the first polarization sense.

A first one of the two logical groups may comprise a plurality of block upconverter (BUC) units as the frequency conversion units, configured for a first polarization sense, and a second one of the two logical groups may comprise a plurality of block upconverter (BUC) units as the frequency conversion units, configured for a second polarization sense that is opposite the first polarization sense.

In an embodiment, a frequency conversion system comprises: a chassis with a plurality of slots; a plurality of frequency conversion units, wherein each of the plurality of frequency conversion units is within a respective one of the plurality of slots, and wherein each frequency conversion unit converts a signal from a first frequency band to a second frequency band using at least one software-configurable local oscillator; a connection matrix that provides an any-to-any connection between one or more inputs of the frequency conversion system and an input of each of the plurality of frequency conversion units, and between one or more outputs of the frequency conversion system and an output of each of the plurality of frequency conversion units; and a controller that for each frequency conversion unit in the plurality of slots, configures the first frequency band and the second frequency band of the frequency conversion unit, switches the frequency conversion unit between an online mode and an offline mode, and monitors the operation of the frequency conversion unit to detect a failure of the frequency conversion unit, and when detecting the failure of a first frequency conversion unit in the online mode, configures a second frequency conversion unit in the offline mode to match a configuration of the first frequency conversion unit, and switches the second frequency conversion unit to the online mode, while switching the first frequency conversion unit to the offline mode.

It should be understood that any of the features described above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, a compact frequency conversion system is disclosed. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1:
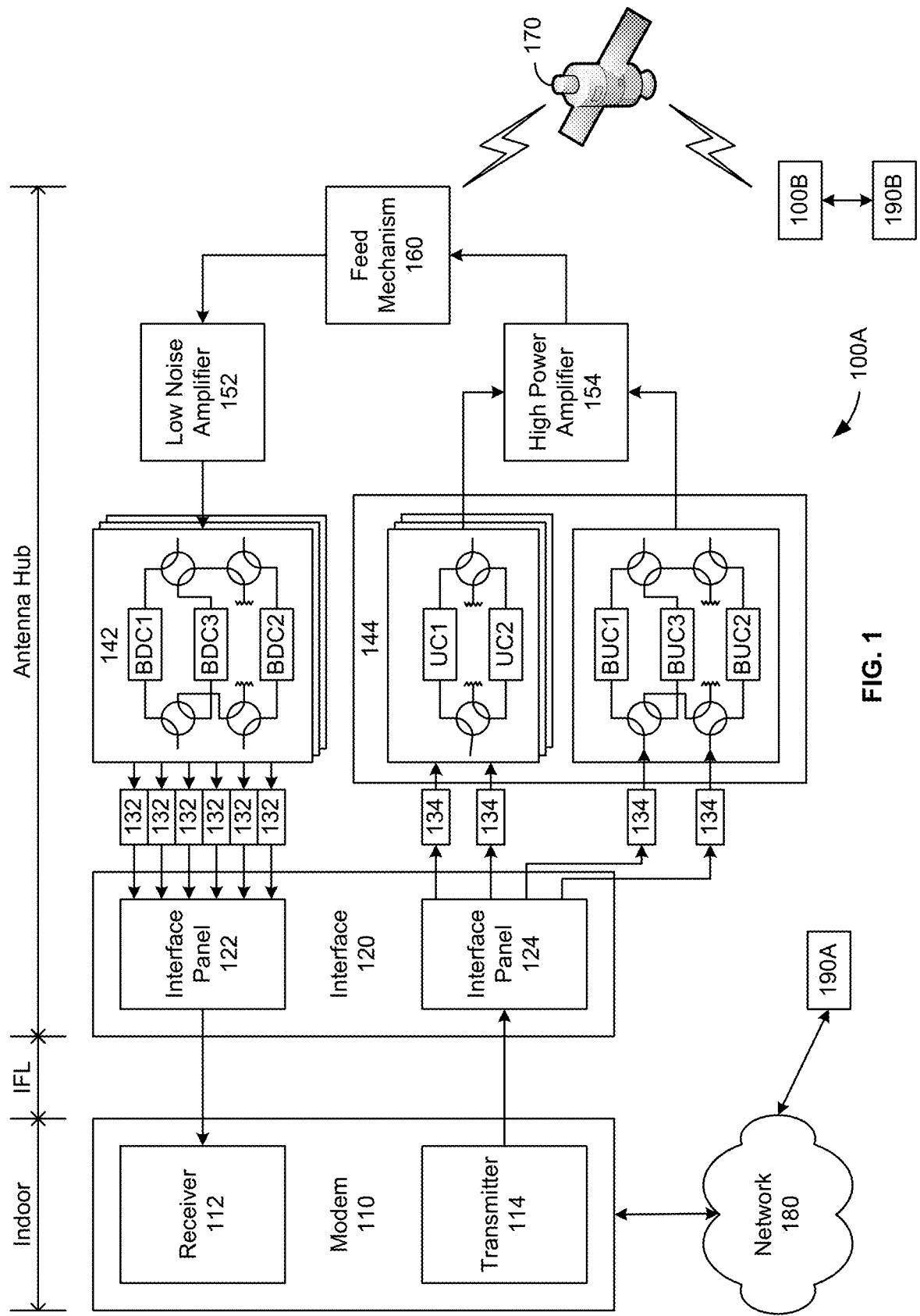
FIG. 1 illustrates an existing gateway, according to an example.

FIG. 1 illustrates an existing gateway 100, according to an example. A modem 110, typically located indoors at a facility, comprises a receiver 112 and a transmitter 114. Modem 110 may be an L-band satellite modem, operating in the long (L) band (i.e., 1-2 Gigahertz (GHz)). Receiver 112 demodulates a signal from a satellite 170 (e.g., after it has been converted to the L band) to recreate digital information, whereas transmitter 114 modulates a signal (e.g., in the L band) to encode digital information for transmission to a satellite 170. Modem 110 may also convert the digital information from the demodulated signal into a communication format, such as Internet Protocol (IP), for transmission to a first device 190A over a network 180 (e.g., an Ethernet network), which may comprise the Internet and/or one or more other networks, as well as receive digital information from first device 190A on network 180 for transmission through satellite 170 to a second device 190B, via a second gateway 100B (and potentially another network). Thus, two devices 190A and 190B may communicate with each other via satellite 170.

Modem 110 may be communicatively coupled to an interface 120 of the antenna hub via an interfacility link (IFL). The interfacility link may physically couple modem 110 in an indoor environment to interface 120 of the antenna hub in an outdoor environment. Interface 120 comprises an interface panel 122 that provides an interface between the antenna hub and receiver 112, and an interface panel 124 that provides an interface between the antenna hub and transmitter 114. Interface panels 122 and 124 may be implemented as separate panels or the same panel.

Interface panel 122 may be communicatively coupled, via couplers 132, to at least one and generally a plurality of block downconverter (BDC) systems 142. Signals from satellite 170 are received by a feed mechanism 160, comprising the antenna feed combiner network. The received signals are passed through a low noise amplifier 152, and then down-converted from a higher frequency band to a lower frequency band by BDC systems 142. For example, BDC systems 142 may convert the frequency of the satellite signal from an EHF band, such as the V band (i.e., 40-75 GHZ), Q band (i.e., 33-50 GHZ), Kurz-above ($K_a$) band (i.e., 26.5-40 GHZ), Kurz (K) band (i.e., 18-26.5 GHZ), and/or Kurz-under ($K_u$) band (i.e., 12-18 GHZ), to the L band. In the illustrated example, a 1:2 redundant BDC system 142 is provided for each of three sub-bands of the supported EHF band, such as a first sub-band consisting of 17.7-18.3 GHZ, a second sub-band consisting of 18.3-18.8 GHZ, and a third sub-band consisting 19.7-20.2 GHz. The down-converted signal in the lower frequency band (e.g., L band) is provided via couplers 132 and interface panel 122 to receiver 112.

Interface panel 124 may be communicatively coupled, via couplers 134, to at least one and generally a plurality of block upconverter (BUC) systems 144. Signals from transmitter 124 are received via interface panel 124 and couplers 134. These signals are then up-converted from a lower frequency band to a higher frequency band by BUC systems 144. For example, BUC systems 144 may convert the frequency of the signal from the L band to an EHF band (e.g., V, Q, $K_a$, K, $K_u$ band, etc.). In the illustrated example, a 1:1 redundant BUC system 144 is provided for each of three sub-bands of the supported EHF band, such as a first sub-band consisting of 27.00-27.55 GHz, a second sub-band consisting of 27.55-28.0 GHZ, and a third sub-band consisting of 29.5-30.05 GHZ, and a 1:2 redundant BUC system 144 is provided for a single sub-band of the supported EHF band, for example, consisting of 27.55-28.6 GHz. The up-converted signal in the higher frequency band is input to a high power amplifier 154, which boosts the power of the signal for transmission to satellite 170. The boosted signal is then transmitted by feed mechanism 160 to satellite 170.

The frequency conversion system, comprising BDC systems 142 and BUC systems 144, consumes a significant amount of the limited space in the antenna hub. For example, in a particular implementation, this frequency conversion system requires at least nine bulky components that consume an entire seven-shelf rack. The frequency conversion system also requires complex connections to interface 120, as well as to low noise amplifier 152 and high power amplifier 154. The design of the frequency conversion system requires significant engineering at significant cost. Furthermore, when a BDC system 142 or BUC system 144 fails, the failed system must be replaced manually at the device level. This means that at the very least a technician must disconnect the failed BDC/BUC system, remove it from the antenna hub, insert a new BDC/BUC system into the rack, and reconnect the new BDC/BUC system. Thus, not only do these frequency conversion systems consume valuable space, they also require significant effort, time, and cost to be serviced and maintained.

Figure 2A:
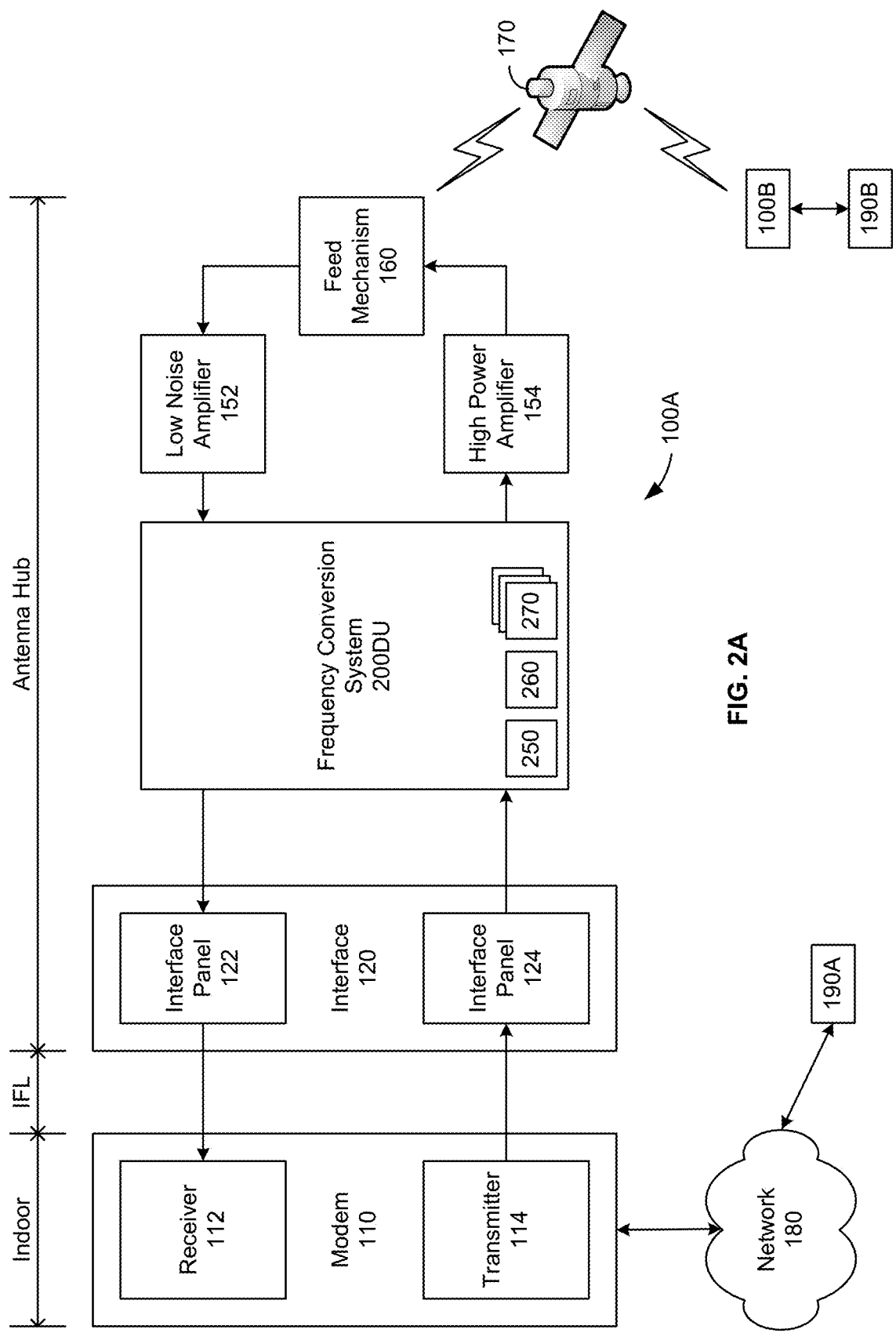
FIGS. 2A and 2B illustrate a gateway with a frequency conversion system, according to alternative embodiments.

FIG. 2A illustrates a gateway 100 with a frequency conversion system 200DU, according to a first embodiment. In this first embodiment, BDC systems 142 and BUC systems 144, along with couplers 132 and 134, have been replaced with a single hybrid frequency conversion system 200DU, which performs both down-conversion and up-conversion. Unlike the existing gateway 100, complex connections are not required between frequency conversion system 200DU and other components. Rather, frequency conversion system 200DU may comprise a back-plane that comprises simple connection ports for connections between frequency conversion system 200DU and interface 120, low noise amplifier 152, and high power amplifier 154. These connections may comprise waveguides, cables, optical fibers, digitalization, and/or the like.

Figure 2B:
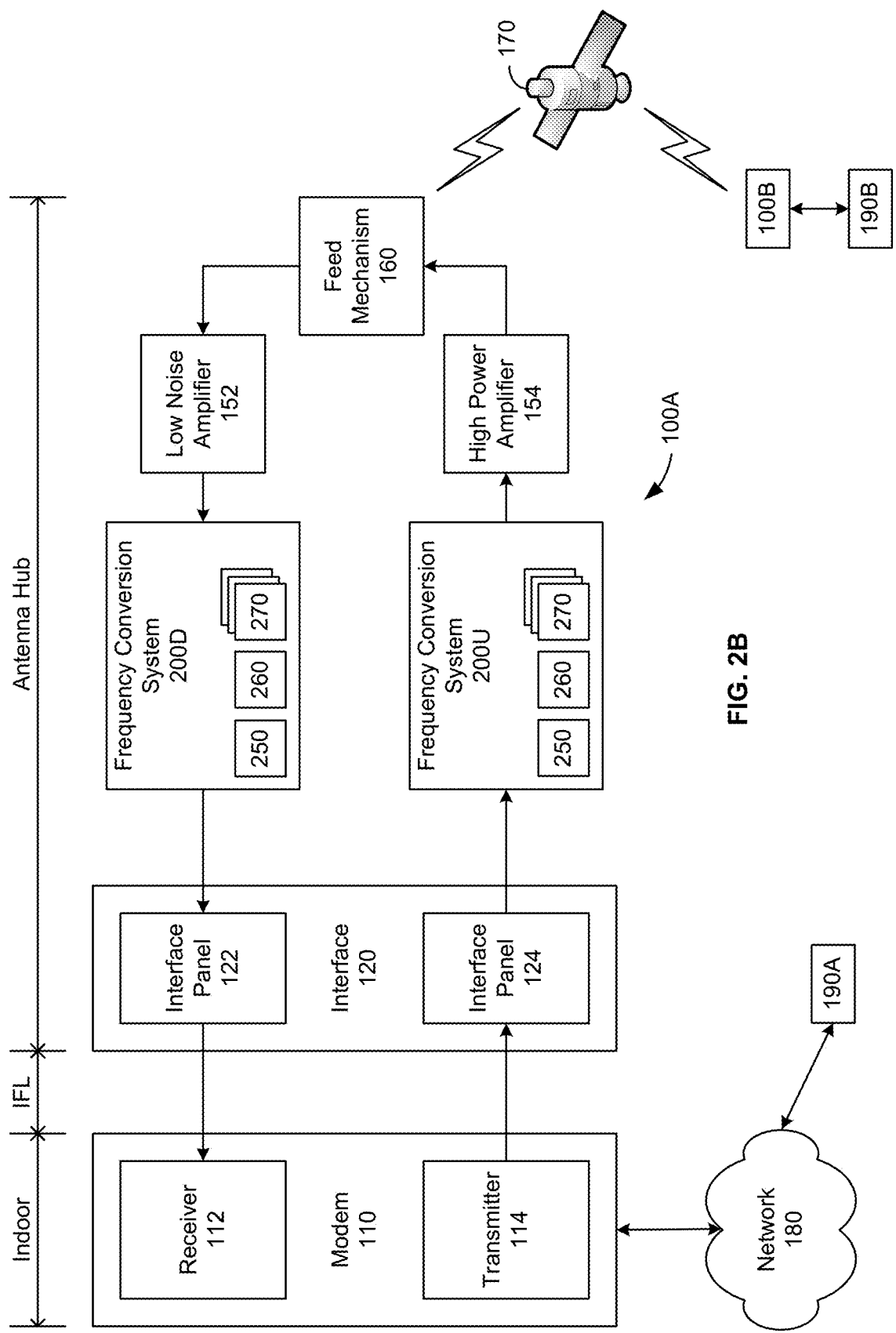

FIG. 2B illustrates a gateway 100 with frequency conversion systems 200D and 200U, according to a second embodiment. In this second embodiment, BDC systems 142 and BUC systems 144, along with couplers 132 and 134, have been replaced with a frequency conversion system 200D for down-conversion and a separate frequency conversion system 200U for up-conversion. Again, unlike the existing gateway 100, complex connections are not required between frequency conversion system 200D or 200U and interface 120. Rather, frequency conversion system 200D may comprise a back-plane that comprises simple connection ports for an output connection to interface panel 122 and an input connection to low noise amplifier 152, and frequency conversions system 200U may comprise a back-plane that comprises simple connection ports for an input connection to interface panel 124 and an output connection to high power amplifier 154.

As used herein, a reference numeral with an appended letter or letters will be used to refer to a specific component, whereas the same reference numeral without any appended letters will be used to refer collectively to a plurality of the component or to refer to a generic or arbitrary instance of the component. Thus, for example, the term "frequency conversion system 200" refers to either frequency conversion system 200DU, 200D, 200U, or any other frequency conversion system with shared attributes, and the term "frequency conversion systems 200" refers to a plurality of frequency conversion systems 200DU, 200D, 200U, or other frequency conversion system with shared attributes or any combination of frequency conversion systems 200DU, 200D, 200U, and any other frequency conversion system with shared attributes.

Each frequency conversion system 200 may comprise a controller 250. Controller 250 may be implemented as a circuit board within a chassis of frequency conversion system 200. In other words, controller 250 may be internal to frequency conversion system 200. Alternatively, controller 250 could be external to frequency conversion system 200, in which case, controller 250 could control a plurality of frequency conversion systems 200. In any case, controller 250 may monitor the frequency conversion in frequency conversion system 200 and/or control (e.g., configure) one or more aspects of frequency conversion system 200, as will be described elsewhere herein.

In addition, each frequency conversion system 200 may comprise a connection matrix 260. Connection matrix 260 may be configured to provide an any-to-any connection between one or more inputs of frequency conversion system 200 and individual frequency conversion units within frequency conversion system 200, and between one or more outputs of frequency conversion system 200 and individual frequency conversion units within frequency conversion system 200. Each frequency conversion unit may comprise one or more software-configurable local oscillators 270, as described in more detail elsewhere herein.

It should be understood that a pair of gateways 100 may communicate with each other via satellite 170. In this case, each gateway 100, on each side of the satellite communication, may comprise similar or identical subsystems. For example, both gateways 100A and 100B may comprise the disclosed frequency conversion system 200. Alternatively, one gateway 100A may comprise the disclosed frequency conversion system 200, while the other gateway 100B comprises a conventional system that does not utilize the disclosed frequency conversion system 200.

Figure 3:
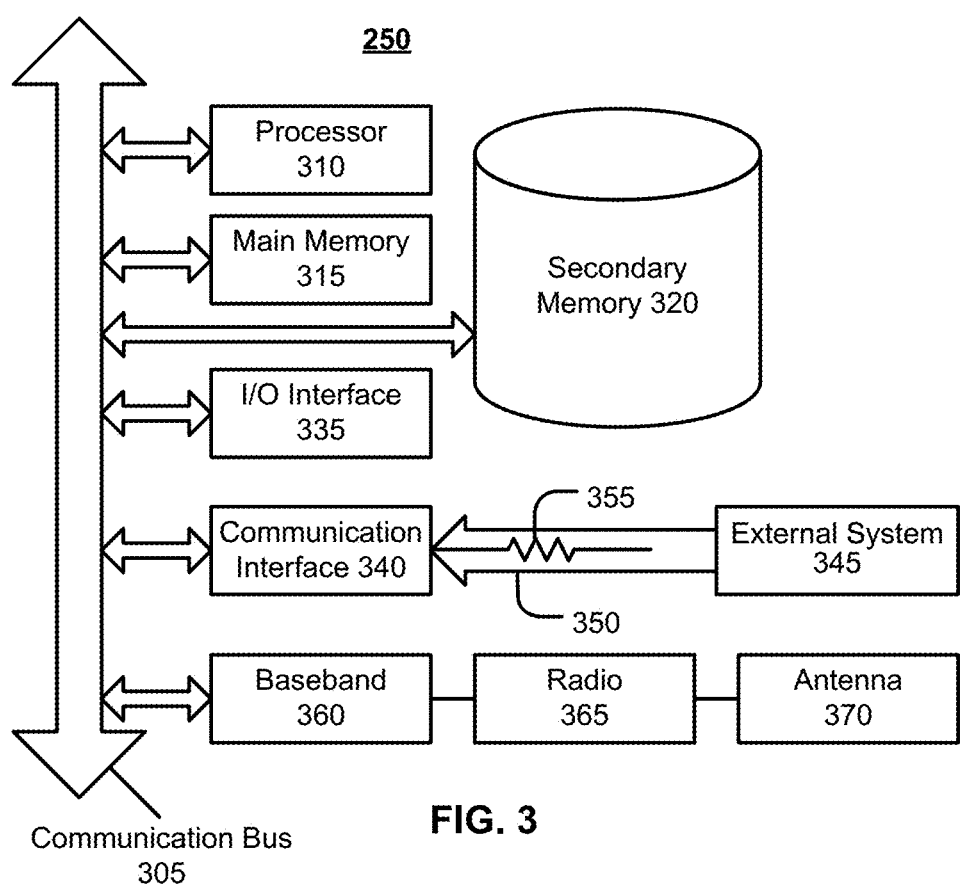
FIG. 3 illustrates an example of a controller, according to an embodiment.

FIG. 3 illustrates an example of controller 250, according to an embodiment. Controller 250 may be any processor-enabled device that is capable of monitoring and/or controlling the components of frequency conversion system 200. Other processing systems and/or architectures may also be used, as will be clear to those skilled in the art.

Controller 250 may comprise one or more processors 310. Processor(s) 310 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 310. Examples of processors which may be used with controller 250 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 310 may be connected to a communication bus 305. Communication bus 305 may include a data channel for facilitating information transfer between storage and other peripheral components of controller 250. Furthermore, communication bus 305 may provide a set of signals used for communication with processor 310, including a data bus, address bus, and/or control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 250 may comprise main memory 315. Main memory 315 provides storage of instructions and data for programs executing on processor 310, such as one or more of the functions discussed herein. It should be understood that programs stored in the memory and executed by processor 310 may be written and/or compiled according to any suitable language, including without limitation C/C++, Java, JavaScript, Perl, Python, Visual Basic, .NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 250 may optionally comprise secondary memory 320. Secondary memory 320 is a non-transitory computer-readable medium having computer-executable code and/or other data stored thereon. In this description, the term "computer-readable medium" is used to refer to any non-transitory computer-readable storage media used to provide computer-executable code and/or other data to or within controller 250. The computer-executable code stored on secondary memory 320 may be read into main memory 315 for execution by processor 310. Secondary memory 320 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Controller 250 may comprise an input/output (I/O) interface 335. I/O interface 335 provides an interface between one or more components of controller 250 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. However, it is generally contemplated that I/O interface 335 will receive data (e.g., status, current configuration, etc.) from and transmit data (e.g., new configuration, etc.) to one or more BDC units, BUC units, and/or other units mounted within frequency conversion system 200, as discussed elsewhere herein.

Controller 250 may comprise a communication interface 340. Communication interface 340 allows computer-executable code and/or other data to be transferred between controller 250 and an external system 345. For example, data may be transferred from an external system 345 (e.g., network server) to controller 250, directly or over one or more networks, via communication interface 340. Similarly, data may be transferred from controller 250 to an external system 345 (e.g., network server), directly or over one or more networks, via communication interface 340. Examples of communication interface 340 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 250 with a network or another computing device. Communication interface 340 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Data transferred via communication interface 340 is generally in the form of electrical communication signals 355. These signals 355 may be provided to communication interface 340 via a communication channel 350 between communication interface 340 and an external system 345. In an embodiment, communication channel 350 may be a direct link, wired or wireless network, or any variety of other communication links. Communication channel 350 carries signals 355 and can be implemented using a variety of wired or wireless communication means, including waveguide, wire or cable, fiber optics, conventional phone line, cellular phone link, wireless data communication link, radio frequency ("RF") link, infrared link, and/or the like.

Computer-executable code is stored in main memory 315 and/or secondary memory 320. Computer-executable code can also be received from an external system 345 via communication interface 340 and stored in main memory 315 and/or secondary memory 320. Such computer-executable code, when executed, enable controller 250 to perform the various functions of the disclosed embodiments as described elsewhere herein.

Controller 250 may comprise wireless communication components that facilitate wireless communication over a data network. The wireless communication components may comprise an antenna system 370, a radio system 365, and a baseband system 360, which is communicatively coupled with processor(s) 310. Radio frequency (RF) signals are transmitted and received over the air by antenna system 370 under the management of radio system 365.

Figure 4A:
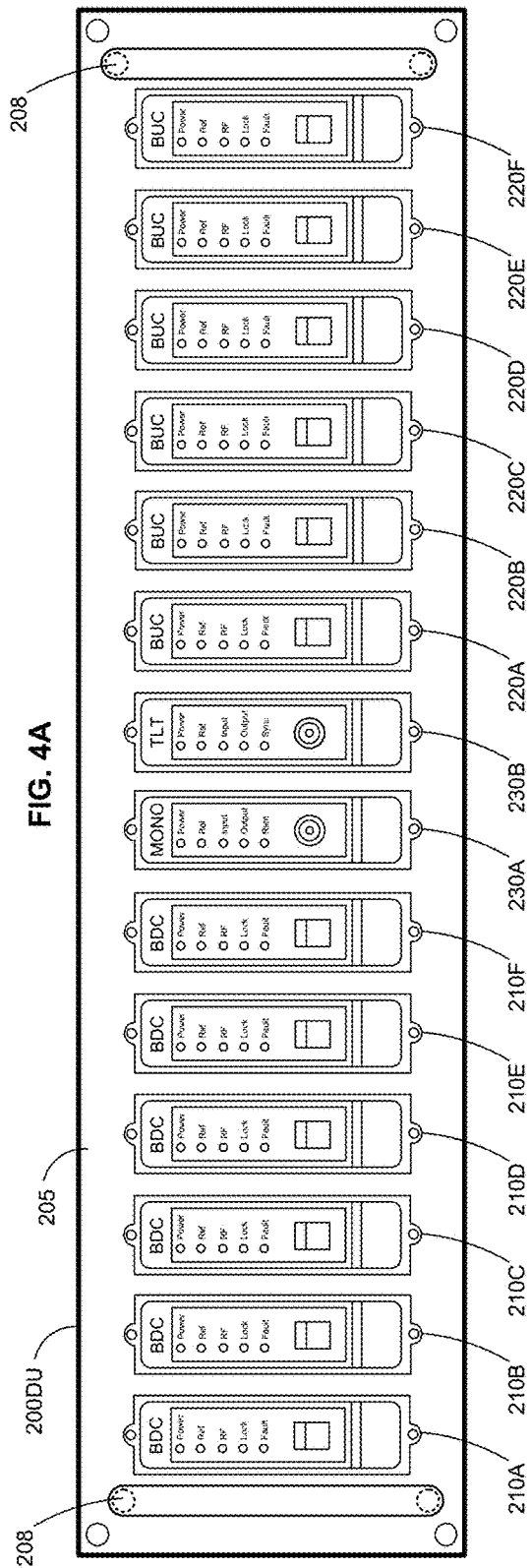
FIGS. 4A-4D illustrate various examples of a frequency conversion system, according to embodiments.
Figure 4B:
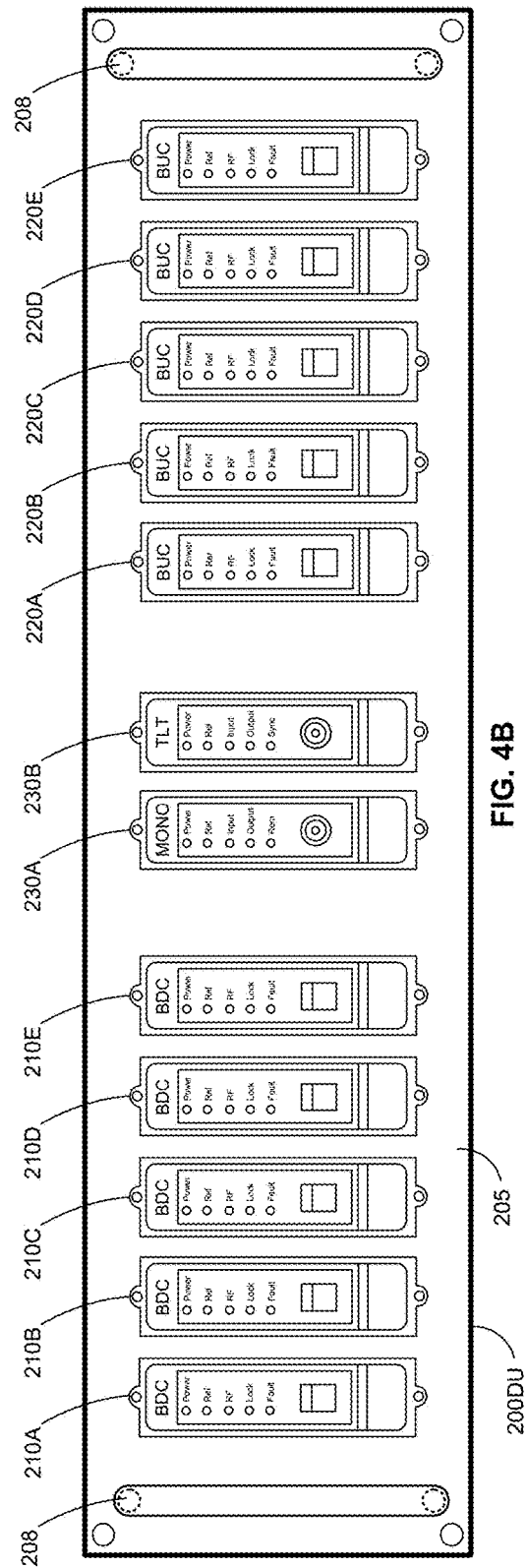
Figure 4C:
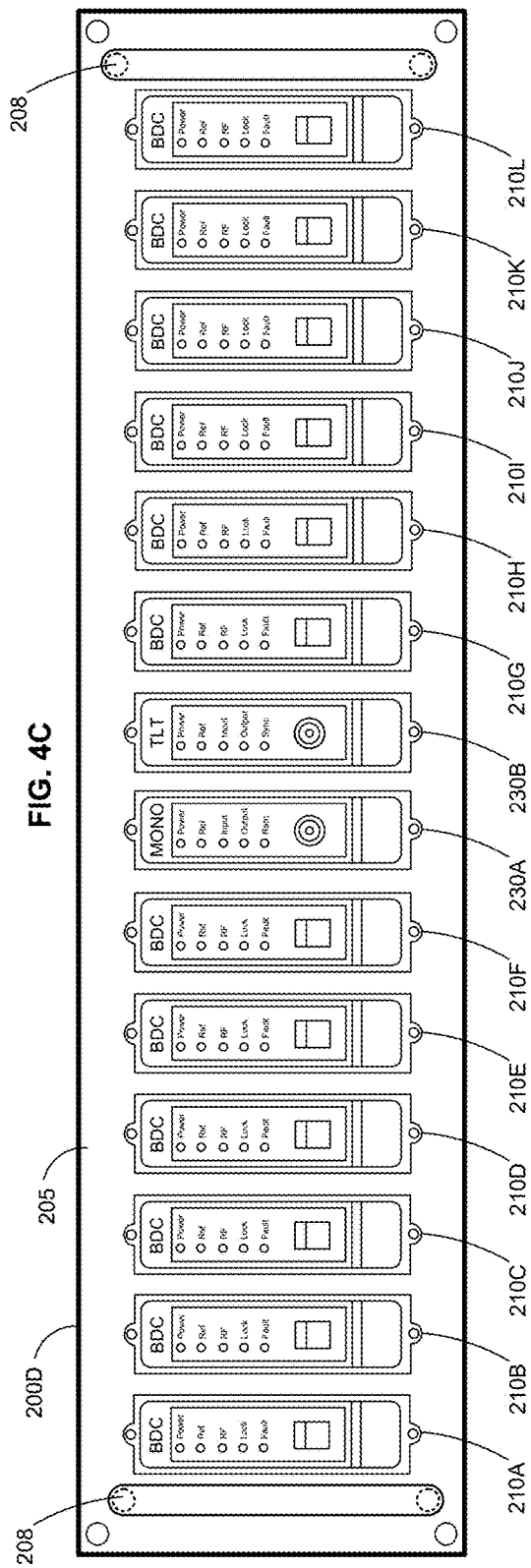
Figure 4D:
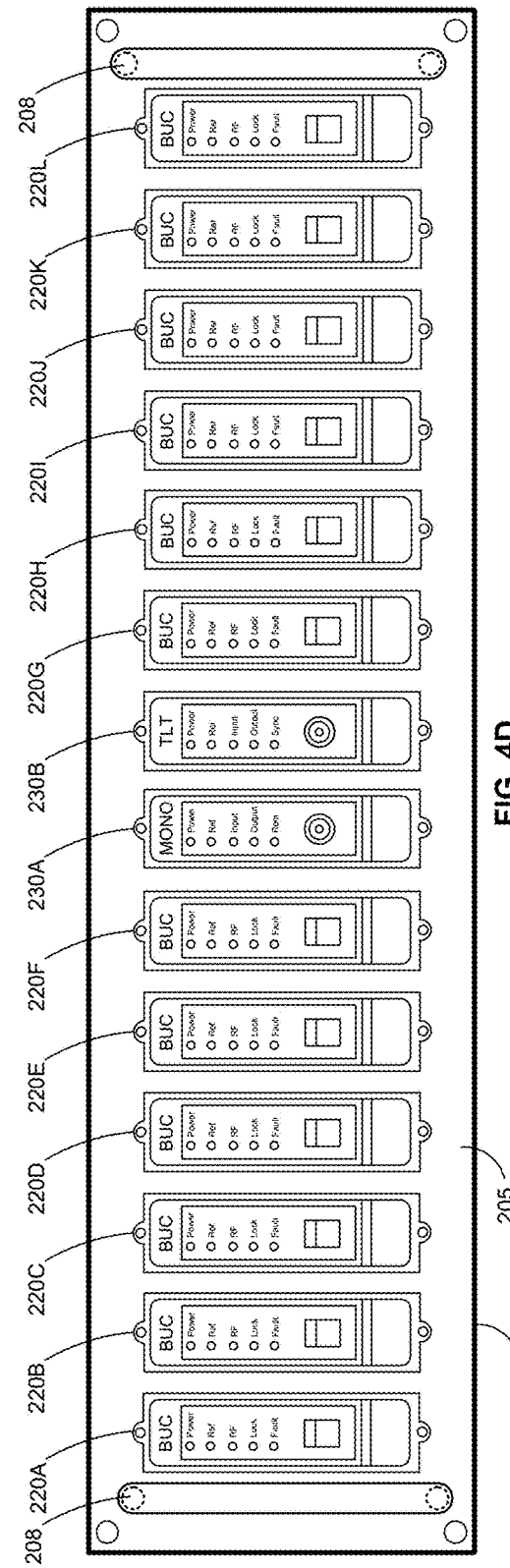

FIGS. 4A-4D illustrate various examples of a frequency conversion system 200, according to embodiments. In particular, FIGS. 4A and 4B illustrate alternative examples of frequency conversion system 200DU, FIG. 4C illustrates an example of frequency conversion system 200D, and FIG. 4D illustrates an example of frequency conversion system 200U, according to embodiments. As illustrated, a single frequency conversion system 200 may be configured strictly for up-conversion, strictly for down-conversion, or for both up-conversion and down-conversion, using different arrangements of BDC and/or BUC units.

In an embodiment, each frequency conversion system 200 may comprise a chassis 205. Chassis 205 may be configured to mounted on a shelf of a rack or National Electrical Manufacturers Association (NEMA) 4X electrical enclosure (not shown), and fastened to the shelf via any appropriate fastening means (e.g., screws, nuts and bolts, etc., through aligned apertures in the front-planes of the chassis 205 and shelf and/or aligned apertures in the back-planes of the chassis 205 and shelf). Chassis 205 may also be unmounted and removed from the shelf by unfastening the fastening means. A plurality of frequency conversion systems 200 may be mounted in a single rack or other enclosure, and/or other subsystems of the antenna hub may be mounted in the same rack or other enclosure as one or more frequency conversion systems 200.

In an embodiment, each frequency conversion system 200 is sized and shaped to slide, as a single unit, into and out of a shelf of a rack or other enclosure. Thus, the entire frequency conversion system 200 can be easily inserted into or pulled out of the rack or other enclosure, as well as fastened to or unfastened from the rack or other enclosure. For example, the front-plane of chassis 205 of frequency conversion system 200 may comprise two pull bars 208 on opposing sides of the front-plane. A technician may grip the pull bars 208 with both hands to lift, push, pull, and otherwise maneuver frequency conversion system 200 within the antenna hub.

Chassis 205 may comprise a plurality of slots through the front-plane of chassis 205. Each slot is configured to receive a modular hardware unit therein. A unit can be inserted through the front-plane into a slot of chassis 205, and fixed within the slot of chassis 205 via any appropriate fastening means (e.g., screws, nuts and bolts, etc., through aligned apertures in the front-planes of the unit and chassis 205 and/or aligned apertures in the back-planes of the unit and chassis 205). Each unit may also be unmounted and removed from chassis 205 by unfastening the fastening means. In an embodiment, each slot may have the same or identical dimensions as each other and each unit may have the same or identical common form factor as each other, such that any unit can be inserted into any slot. In an alternative embodiment, one or more slots may have different dimensions than one or more other slots, and one or more units may have different form factors than other units, such that only certain units or types of units can be inserted into certain slots in chassis 205.

Chassis 205 may comprise a connection matrix 260 on the back-plane. Connection matrix 260 may be configured to provide an any-to-any connection between one or more inputs of frequency conversion system 200 and units within the slots, and between one or more outputs of frequency conversion system 200 and units within the slots. In other words, each input port to frequency conversion system 200 may be communicatively couplable to the input port of any slot in chassis 205, which corresponds to the input of any unit within that slot, and each output port from frequency conversion system 200 may be communicatively couplable to the output port of any slot in chassis 205, which corresponds to the output of any unit within that slot.

Chassis 205 may also comprise a shared power supply (not shown). The shared power supply could comprise an electrical connection to a power source (e.g., power grid), a battery system (e.g., uninterruptible power supply (UPS)), and/or the like. The shared power supply may be electrically coupled to a power input of each slot, to thereby power each unit in each slot.

Controller 250 may be configured to control connection matrix 260. In particular, controller 250 may configure connection matrix 260 to connect any input of the frequency conversion system 200 to the input of any slot and any output of the frequency conversion system 200 to the output of any slot. Thus, the communicative couplings with units in the slots can be switched automatically (i.e., without the need for a technician to physically change the connections). The controller may also comprise a connection to a control port of each slot, which corresponds to the control port of any unit within that slot, such that the controller can automatically configure any unit in any slot.

Controller 250 may operate independently. Alternatively or additionally, controller 250 may be controlled by an external system 345, which may send commands to be implemented by controller 250, and to which controller 250 may report data, such as status, metrics, and/or the like. In this case, external system 345 may control controller 250 of each frequency conversion system 200 manually (e.g., in response to user operations), automatically (e.g., without any user input), semi-automatically (e.g., automatically with confirmation or other input from a user), and/or the like.

Each unit that is mounted or mountable in frequency conversion system 200 may comprise a circuit board, which implements one or more functions, within a laser-sealed enclosure. The enclosure of each unit may hermetically seal the circuit board, as well as shield the circuit board against electromagnetic interference. In an embodiment, the size of each unit is approximately the same size as a moderately sized smartphone (e.g., a length of 120-160 millimeters, a width of 58-79 millimeters, and a depth of 7-10 millimeters). This compact design allows for the units to be arranged side by side in the slots of chassis 205, and easily inserted and removed, even during operation of frequency conversion system 200.

The units may be plug-and-play. For example, insertion of a unit into a slot may automatically connect a control port of the unit to controller 250, and the inputs and outputs of the unit to connection matrix 260 of chassis 205. Thus, controller 250 may automatically detect the connection and boot the unit as soon as the unit is inserted. Conversely, when the unit is removed from the slot, controller 250 may automatically detect the disconnection and reconfigure frequency conversion system 200 to account for the removal of the unit.

The units mounted within the slots of chassis 205 may comprise one or more software-defined BDC units 210 and/or one or more software-defined BUC units 220. Each software-defined BDC unit 210 and BUC unit 220 may comprise a miniaturized discrete frequency conversion board with one or more software-configurable local oscillators 270. Each local oscillator 270 produces a signal that is mixed with an input signal to change the frequency of the input signal. The frequency of the signal, output by the local oscillator 270, may be tunable, synthesizable, or otherwise configurable, such that an input signal to the conversion unit 210 or 220 at any first frequency can be down-converted or up-converted into an output signal at any second frequency, under the control of controller 250. In down-conversion by a BDC unit 210, the second frequency will be lower than the first frequency, whereas, in up-conversion by a BUC unit 220, the second frequency will be higher than the first frequency.

Each frequency conversion unit 210 and 220 may be configurable to convert a signal in any input frequency band, within at least a first range of the radio spectrum, into any output frequency band, within at least a second range of the radio spectrum. Thus, for example, controller 250 could configure a BDC unit 210 to down-convert an input signal from a first frequency band into a second frequency band at a first time, and then reconfigure the BDC unit 210 to down-convert the input signal from a third frequency band into a fourth frequency band at a second time. Consequently, reconfiguration of frequency conversion system 200, including individual units mounted within frequency conversion system 200, can occur on the fly, strictly using software, without the use of external switches, waveguides, cables, or the like, and without the need for new equipment. In addition, this reconfiguration can occur on the more granular channel level, rather than the device level required by existing gateways 100.

The units mounted within the slots of chassis 205 may also comprise units 230, other than frequency conversion units 210 and 220. Due to the presence of frequency-converted signals in frequency conversion system 200, other units 230 may be brought online to process or sample these signals without the need for external interfaces. For example, other units 230 could comprise a dual BDC unit for monopulse, a test loop translator (TLT) for telemetry, tracking, and command (TT&C) ranging, a system for complex carrier monitoring, for example, using a field-programmable gate array (FPGA) digital signal processor (DSP), or the like. More generally, one or more units 230 may be inserted into chassis 205 to provide any function that may be useful for frequency conversion by conversion units 210 and/or 220 under the control of controller 250.

Each unit, when inserted into a slot of chassis 205, may report one or more parameters to controller 250, for example, via a connection between a control port of the slot and controller 250. The parameter(s) may be reported continuously, at regular intervals, or in response to polling by controller 250. The parameter(s) may comprise a state, operating mode, input frequency, output frequency, and/or the like. Thus, controller 250 may monitor the operation of each unit, including each conversion unit 210 and 220, as well as any other units 230.

As illustrated in FIG. 4A, frequency conversion system 200DU may comprise a plurality of BDC units 210, a plurality of BUC units 220, and optionally one or more other units 230. In the illustrated example, frequency conversion system 200DU comprises six BDC units 210, six BUC units 220, and two other units 230, consisting of a dual BDC unit 230A for monopulse and a TLT unit 230B. Each BDC unit 210 may perform down-conversion from at least one sub-band of the EHF bandwidth to a frequency band (e.g., L band) of modem 110, and each BUC unit 220 may perform up-conversion from the frequency band of modem 110 to at least one sub-band of the EHF bandwidth. In addition, each BDC unit 210 and BUC unit 220 may be programmable, such that the sub-band of the EHF bandwidth for which any given unit operates may be set by controller 250. Collectively, BDC units 210 perform down-conversion for the entire supported EHF bandwidth, and BUC units 220 perform up-conversion for the entire supported EHF bandwidth. In other words, collectively, the sub-bands of the EHF band that are converted by BDC units 210 and BUC units 220 span the entire EHF bandwidth to be supported by frequency conversion system 200DU. The conversion units 210 and 220 may be provided with redundancy, as described elsewhere herein.

The EHF band that used for communications with satellite 170 is typically 3-4 GHZ in width. In an embodiment, each frequency conversion unit 210 and 220 may be configured to convert an approximately 1 GHz sub-band of this EHF band. In such an embodiment, three to four BDC units 210 and three to four BUC units 210 are required for the full frequency conversion. However, it should be understood that this is simply one non-limiting example, and that many other configurations are possible.

FIG. 4B illustrates an alternative example of frequency conversion system 200DU. In this alternative example, chassis 205 physically divides the slots into distinct sections, such as left, center, and right sections. These physical sections may correspond to logical groups of units. For example, in the illustrated example, the left section corresponds to all of the BDC units 210, the right section corresponds to all of the BUC units 220, and the center section corresponds to all other units 230. Thus, a technician can easily visually differentiate between the different logical groups of units. Each logical group may represent a particular type of unit, a particular function, a particular redundancy, and/or the like. Notably, the same effect may be achieved using the example in FIG. 3A, by simply leaving particular slots in chassis 205 empty. In this case, the empty slots divide the sections or groups of units. It should be understood that, while mounting units in the slots in a manner that divides the logical groups into respective physical sections may be preferred from a convenience standpoint, it is not a requirement of any embodiment. In other words, the logical groups do not have to correspond to the physical sections of chassis 205.

As illustrated in FIG. 4C, frequency conversion system 200D may comprise a plurality of BDC units 210, and optionally one or more other units 230. In the illustrated example, frequency conversion system 200D comprises twelve BDC units 210, and two other units 230, consisting of dual BDC unit 230A and TLT unit 230B. The twelve BDC units 210 may be logically divided into two groups. For example, BDC units 210A-210F may be a first group, and BDC units 210G-210L may be a second group. Notably, BDC units 210 may also be physically divided into these two groups by positioning the first group on one side (e.g., left side) of other units 230 and positioning the second group on the opposite side (e.g., right side) of other units 230. In other words, other units 230 divide BDC units 210 into the first and second groups. Collectively, the first and second groups of BDC units 210 may provide down-conversion for two opposite polarization senses. For example, the first group of BDC units 210A-210F may perform down-conversion for left-hand circular polarization, and the second group of BDC units 210G-210L may perform down-conversion for right-hand circular polarization. Alternatively, the first group of BDC units 210A-210F may perform down-conversion for horizontal linear polarization, and the second group of BDC units 210G-210L may perform down-conversion for vertical linear polarization. In any case, each group may be provided with redundancy, as described elsewhere herein. It should be understood that these are simply examples, and that various alternative configurations are possible.

As illustrated in FIG. 4D, frequency conversion system 200U may comprise a plurality of BUC units 220, and optionally one or more other units 230. In the illustrated example, frequency conversion system 200U comprises twelve BUC units 220, and two other units 230, consisting of dual BDC unit 230A and TLT unit 230B. The twelve BUC units 220 may be logically divided into two groups. For example, BUC units 220A-220F may be a first group, and BUC units 220G-220L may be a second group. Notably, BUC units 220 may also be physically divided into these two groups by positioning the first group on one side (e.g., left side) of other units 230 and positioning the second group on the opposite side (e.g., right side) of other units 230. In other words, other units 230 divide BUC units 220 into the first and second groups. Collectively, the first and second groups of BUC units 220 may provide up-conversion for two opposite polarization senses. For example, the first group of BUC units 220A-220F may perform up-conversion for left-hand circular polarization, and the second group of BUC units 220G-220L may perform up-conversion for right-hand circular polarization. Alternatively, the first group of BUC units 220A-220F may perform up-conversion for horizontal linear polarization, and the second group of BUC units 220G-220L may perform up-conversion for vertical linear polarization. In any case, each group may be provided with redundancy, as described elsewhere herein. It should be understood that these are simply examples, and that various alternative configurations are possible.

Any of the described frequency conversion systems 200 may be implemented with the chassis 205 of FIG. 4A, comprising a set of uniformly spaced slots, or FIG. 4B, comprising a plurality of sets of slots, with each slot spaced apart from any adjacent slots in the same set by a first width and each set spaced apart from any adjacent sets by a second width that is greater than the first width, so as to form a plurality of physical sections. Other configurations of chassis 205 are also possible. For example, chassis 205 may comprise fewer or more slots than illustrated, chassis 205 may comprise multiple rows of slots, chassis 205 may comprise different physical divisions of slots than illustrated, and/or the like.

In addition, units may be grouped in any manner, or may not be grouped at all. For example, in the illustrated embodiments, BDC units 210 and BUC units 220 are physically grouped into logical sets. However, while this may make it easier for a technician to service frequency conversion system 200, it is not a necessity for the operation of frequency conversion system 200. Rather, BDC units 210 and/or BUC units 220 can be distributed across the slots in any manner, including in a random manner. In an embodiment in which connection matrix 260 provides an any-to-any correspondence, the physical position of a unit within chassis 205 does not affect the ability of controller 250 to configure that unit as needed.

In an embodiment, frequency conversion system 200 may implement M:N redundancy, in which M backup units are provided for every N online units. For example, in 1:5 redundancy, the set of six BDC units 210A-210F in frequency conversion system 200DU may comprise five online units and one backup unit. The backup unit may be a hot spare, which, unlike the online units, is offline, but, like the online units, is active, so that it can be quickly reconfigured and switched online when needed. As another example, in 1:2 redundancy, the set of six BDC units 210A-210F in frequency conversion system 200DU may comprise four online units and two backup units. Redundancy in the BUC units 220A-220F in frequency conversion system 200DU may be established in a similar manner. It should be understood that the redundancy level of the BDC units 210 and the redundancy of the BUC units 220 may be the same or may be different. Alternatively, the BDC units 210 and/or BUC units 220 may be set without any redundancy (i.e., all units are online).

Redundancy may be provided in the other examples of frequency conversion systems 200 in a similar manner. More generally, any logical group of conversion units 210 and/or 220 may be implemented with redundancy. For example, in frequency conversion system 200D, the first group of BDC units 210A-210F may implement M:N (e.g., 1:5) redundancy, and the second group of BDC units 210G-210L may also implement M:N (e.g., 1:5) redundancy. Similarly, in frequency conversion system 200U, the first group of BUC units 220A-220F may implement M:N (e.g., 1:5) redundancy, and the second group of BUC units 220G-220L may also implement M:N (e.g., 1:5) redundancy. The redundancies between the first and second groups will generally be the same, but this is not a requirement of any embodiment. Rather, the redundancies between the first and second groups could be different.

The redundancy for a logical group of conversion units 210 and 220 may be changed on the fly. In particular, controller 250 may reconfigure a group of conversion units 210 and/or 220 from a first redundancy to a second redundancy. For example, assume that the group of BDC units 210A-210F in frequency conversion system 200DU are operating at 1:5 redundancy, with BDC units 210A-210E online and BDC unit 210F as the backup. To switch this group to 1:2 redundancy, controller 250 may reconfigure BDC units 210A-210D to perform conversion for the frequency bands for which they are already performing conversion as well as for the frequency band for which BDC unit 210E was performing conversion. Then, controller 250 may switch BDC unit 210E to the offline mode, to act as a backup in addition to BDC unit 210F. Thus, there are four online BDC units 210 and two offline backup BDC units 210 (i.e., 2:4 redundancy).

Figure 5:
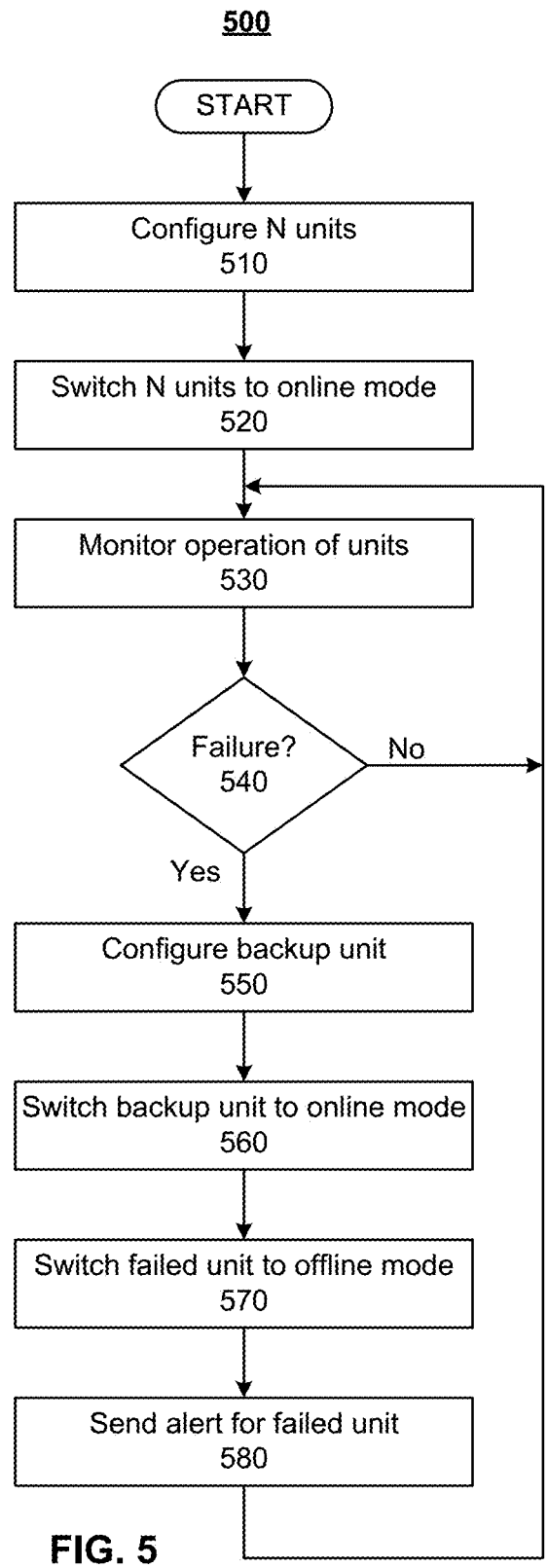
FIG. 5 illustrates a process for providing redundancy in a frequency conversion system, according to an embodiment.

FIG. 5 illustrates a process 500 for providing redundancy in a frequency conversion system 200, according to an embodiment. With redundancy, controller 250 may automatically bring a backup unit online in the event of a failure of an online unit. Process 500 may be performed for each logical group of redundant frequency conversion units (i.e., BDC units 210 and/or BUC units 220).

Process 500 may be implemented by controller 250. For example, in an embodiment, process 500 is implemented as software stored in main memory 215 and/or secondary memory 320 and executed by processor(s) 310 of controller 250. In an alternative embodiment, process 500 could be implemented entirely as hardware components or as a combination of software and hardware components within controller 250.

While process 500 is illustrated with a certain arrangement and ordering of subprocesses, process 500 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 510, when frequency conversion system 200 is brought online, controller 250 may configure at least the N frequency conversion units in the M:N redundancy. This configuration may comprise setting the input frequency band and the output frequency band of each frequency conversion unit. Controller 250 may also configure other units 230, and optionally the M backup frequency conversion unit(s). It should be understood that the N frequency conversion units and the M backup frequency conversion unit(s) may be BDC units 210 and/or BUC units 220.

In subprocess 520, controller 250 may switch the N frequency conversion units to the online mode. Controller 250 may also switch one or more other units 230 to an online mode. The M backup frequency conversion unit(s) may be switched to or maintained in the offline mode. However, at least one, and potentially all, backup frequency conversion unit(s) may remain active as hot spare(s) that can be hot swapped, when needed, by simply switching each backup frequency conversion unit from the offline mode to the online mode.

In subprocess 530, controller 250 monitors the operation of at least the N online frequency conversion units. Controller 250 may also monitor the operation of other units 230, and optionally the M backup frequency conversion unit(s) if active as hot spare(s). In particular, controller 250 may receive one or more parameters from each unit being monitored, via the control connections in their respective slots. These parameter(s) may comprise a state, operating mode, input frequency, output frequency, and/or the like.

In subprocess 540, controller 250 may determine whether or not a failure has occurred in the N online frequency conversion units, based on the parameter(s) received from the monitored units, including potentially the lack of parameter(s) being received from the monitored units (e.g., a monitored unit is not transmitting parameter(s) at an expected timing). In particular, the parameter(s) or lack of parameter(s) may indicate that a frequency conversion unit is in a fault state, is not operating within normal limits, is not properly performing its respective function, and/or the like. When a failure is detected (i.e., "Yes" in subprocess 540), process 500 proceeds to subprocess 550. Otherwise, while no failure is detected (i.e., "No" in subprocess 540), process 500 continues to monitor the operation of at least the N online frequency conversion units.

In subprocess 550, after a failure has been detected, the controller configures one of the M backup frequency conversion units to match the configuration of the failed one of the N online frequency conversion units. For example, controller 250 may store the configuration for each N online frequency conversion unit in secondary memory 320. When controller 250 detects that one of the N online frequency conversion units has failed in subprocess 540, controller 250 may retrieve the configuration for the failed online frequency conversion unit, and configure the backup frequency conversion unit according to the retrieved configuration. In other words, the failed frequency conversion unit and the backup frequency conversion unit will have identical configurations.

In subprocess 560, controller 250 may switch the backup frequency conversion unit, as configured in subprocess 550, from the offline mode to the online mode. Conversely, in subprocess 570, controller 250 may switch the failed frequency conversion unit from the online mode to the offline mode. In particular, controller 250 may control connection matrix 260 of frequency conversion system 200 to switch the connection between an input of frequency conversion system 200 and the input of the failed frequency conversion unit to a connection between the input of frequency conversion system 200 and an input of the backup frequency conversion system, and switch a connection between an output of frequency conversion system 200 and the output of the failed frequency conversion unit to a connection between the output of frequency conversion system 200 and an output of the backup frequency conversion system. This switching simultaneously switches the backup frequency conversion unit to the online mode and switches the failed frequency conversion unit to the offline mode. In other words, subprocesses 560 and 570 are not necessarily discrete subprocesses.

In subprocess 580, controller 250 may initiate an alert for the failed frequency conversion unit. For example, controller 250 may transmit a notification to an external system 345, which may be an upstream control system. The upstream control system may then notify a user, so that a technician can be dispatched to replace the failed frequency conversion unit. Alternatively, controller 250 may transmit a notification directly to a user. In either case, the notification may identify the frequency conversion system 200, the failed frequency conversion unit, and/or the like. The notification to the user may comprise a message in a graphical user interface, an email message, a text message, a voice message, and/or the like. In an alternative or additional embodiment, the alert may include an indicator light (e.g., fault light) on a visible interface (e.g., front panel) of the failed frequency conversion unit itself.

Although not specifically illustrated, after subprocess 570 and before subprocess 580, controller 250 could attempt to automatically recover the failed frequency conversion unit. For example, controller 250 could apply standard failure recovery techniques, such as rebooting the failed frequency conversion unit, running diagnostics on the failed frequency conversion unit, and/or the like. In this case, if controller 250 is able to recover the failed frequency conversion unit, subprocess 580 may be omitted. Alternatively, controller 250 could still execute subprocess 580, since the failure may be recurrent.

Although not specifically illustrated, in subprocess 530, controller 250 may also monitor the M backup frequency conversion units, which may be maintained as hot spares. In this case, when a failure of one of the M backup frequency conversion units is detected in subprocess 540, controller 250 may initiate the alert in subprocess 580. Notably, subprocesses 550-570 would be omitted in this scenario, since the failed frequency conversion unit is already offline and there is generally no reason to configure a failed frequency conversion unit.

After subprocess 580, a technician, having received the alert, may physically remove the failed frequency conversion unit from its respective slot in chassis 205. Then, the technician may insert a new frequency conversion unit into that same slot. Controller 250 may automatically detect, boot, initialize, test, configure, and/or the like, the newly inserted frequency conversion unit. This newly inserted frequency conversion unit becomes one of the M backup frequency conversion units, such that the M:N redundancy of the logical group is maintained.

Advantageously, in the failure detection in process 500, represented by subprocesses 530-580, a backup frequency conversion unit can be programmed on the fly to mimic and replace the failed frequency conversion unit. For example, assume that BDC units 210A-210E in frequency conversion system 200DU are online and that BDC unit 210F is a hot spare (i.e., 1:5 redundancy), and that BDC unit 210C fails. Controller 250 may automatically detect the failure of BDC unit 210C (e.g., in subprocess 540), based on the parameter (s) received or unexpectedly not received from BDC unit 210C. Responsively, controller 250 configures backup BDC unit 210F to the same configuration of failed BDC unit 210C (e.g., in subprocess 550), and brings configured backup BDC unit 210F online (e.g., subprocess 560) while taking failed BDC unit 210C offline (e.g., subprocess 570) by switching the inputs and outputs of failed BDC unit 210C to backup BDC unit 210F. Once failed BDC unit 210C is offline, the controller may apply standard failure recovery techniques to failed BDC unit 210C. Alternatively or if the failure recovery techniques are unsuccessful, controller 250 may issue an alert (e.g., in subprocess 580), so that a technician may physically replace failed BDC unit 210C with a new BDC unit 210. In particular, the technician may remove failed BDC unit 210C from its respective slot, and insert a new BDC unit 210 into the emptied slot. Whether BDC unit 210C is recovered or replaced, the BDC unit 210 in the slot (e.g., recovered BDC unit 210C or a new BDC unit 210) becomes the backup BDC unit 210 to be used in the event of a future failure. Thus, the 1:5 redundancy is maintained. It should be understood that a similar example may be provided for BUC units 220 and even other units 230.

A plurality of frequency conversion systems 200 may be used together to implement frequency conversion in an antenna hub. For example, frequency conversion system 200D and frequency conversion system 200U are used together to perform down-conversion and up-conversion, respectively, for the entire supported EHF band. As another example, a plurality of frequency conversion systems 200DU may be used together to collectively perform frequency conversion for the entire supported EHF band, with each frequency conversion system 200DU performing frequency conversion for a different sub-band of the supported EHF band. As an additional example, a plurality of frequency conversion systems 200D may be used together to collectively perform down-conversion for each of a plurality of sub-bands of the supported EHF band, and a plurality of frequency conversion systems 200U may be used together to collectively perform up-conversion for each of a plurality of sub-bands of the supported EHF band. In other words, frequency conversion systems 200 may be stacked together (e.g., on different shelves of the same rack or other enclosure) to create an overarching frequency conversion system of any size, as well as any level of redundancy. Unlike conventional systems, each frequency conversion system 200 is compact, with built-in automated software-controlled configurability and redundancy and easy replaceability on both a channel level and a device level.

Advantageously, the disclosed frequency conversion system 200 reduces the space required for frequency conversion in the antenna hub, enabling frequency conversion system 200 to be collocated proximate to the antenna feed combiner network, while also simplifying the connection to other subsystems, such as interface panel 120, low noise amplifier 152, and high power amplifier 154. In addition, each unit (e.g., BDC units 210, BUC units 220, and other units 230) may share a common form factor, so that the units of the same type are fungible and can be easily swapped in and out as needed (e.g., to address a failure in a unit), and so that units of different types may also be swapped in and out as needed to change the configuration of frequency conversion system 200 (e.g., change the redundancy level, increase the number of BDC units 210 or BUC units 220, decrease the number of BDC units 210 or BUC units 220, change the functions performed by other units 230, etc.).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A frequency conversion system comprising:
   a chassis with a plurality of slots, wherein each of the plurality of slots is configured to receive a frequency conversion unit, and wherein each frequency conversion unit is configured to convert a signal from a first frequency band to a second frequency band using at least one software-configurable local oscillator; and
   a controller configured to
      for each frequency conversion unit in the plurality of slots,
         configure the first frequency band and the second frequency band of the frequency conversion unit,
         switch the frequency conversion unit between an online mode and an offline mode, and
         monitor the operation of the frequency conversion unit to detect a failure of the frequency conversion unit, and
      when detecting the failure of a first frequency conversion unit in the online mode,
         configure a second frequency conversion unit in the offline mode to match a configuration of the first frequency conversion unit, and
         switch the second frequency conversion unit to the online mode, while switching the first frequency conversion unit to the offline mode.

2. The frequency conversion system of claim 1, wherein the chassis comprises a front-plane, and wherein the plurality of slots are through the front-plane.

3. The frequency conversion system of claim 2, wherein the chassis comprises two pull bars on opposing sides of the front-plane.

4. The frequency conversion system of claim 1, wherein each of the plurality of slots has identical dimensions to each of the other plurality of slots.

5. The frequency conversion system of claim 1, further comprising a plurality of the frequency conversion units, wherein each of the plurality of frequency conversion units is mounted within a respective one of the plurality of slots.

6. The frequency conversion system of claim 5, wherein each of the plurality of frequency conversion units has an identical form factor as each of the other plurality of frequency conversion units.

7. The frequency conversion system of claim 5, further comprising a connection matrix that is configured to provide an any-to-any connection between one or more inputs of the frequency conversion system and an input of each of the plurality of frequency conversion units, and between one or more outputs of the frequency conversion system and an output of each of the plurality of frequency conversion units.

8. The frequency conversion system of claim 7, wherein the controller is further configured to control the connection matrix to connect any of the one or more inputs of the frequency conversion system to the input of any one of the plurality of frequency conversion units, and connect any of the one or more outputs of the frequency conversion system to the output of any one of the plurality of frequency conversion units.

9. The frequency conversion system of claim 5, further comprising a shared power supply, wherein the shared power supply is configured to provide power to all of the plurality of frequency conversion units in the plurality of slots.

10. The frequency conversion system of claim 5, wherein the plurality of frequency conversion units comprises two or more block downconverter (BDC) units that each down-converts an input signal at a first frequency into an output signal at a second frequency, wherein the second frequency is lower than the first frequency.

11. The frequency conversion system of claim 5, wherein the plurality of frequency conversion units comprises two or more block upconverter (BUC) units that each up-converts an input signal at a first frequency into an output signal at a second frequency, wherein the second frequency is higher than the first frequency.

12. The frequency conversion system of claim 5, wherein the plurality of frequency conversion units comprises:
two or more block downconverter (BDC) units that each down-converts an input signal at a first frequency into an output signal at a second frequency, wherein the second frequency is lower than the first frequency; and
two or more block upconverter (BUC) units that each up-converts an input signal at a third frequency into an output signal at a fourth frequency, wherein the fourth frequency is higher than the third frequency.

13. The frequency conversion system of claim 5, wherein each of the plurality of frequency conversion units is removable from the respective slot.

14. The frequency conversion system of claim 1, wherein the frequency conversion units are arranged into one or more logical groups, and wherein the controller implements M:N redundancy for each of the one or more logical groups by, for each of the one or more logical groups, for each N frequency conversion units in the logical group that are in the online mode, maintaining M frequency conversion units in the logical group in the offline mode.

15. The frequency conversion system of claim 14, wherein the controller is configured to maintain at least one of the M frequency conversion units as active for use as a hot spare.

16. The frequency conversion system of claim 14, wherein, in each of the one or more logical groups, each of the N frequency conversion units in the logical group performs frequency conversion for a different sub-band of an extremely high frequency (EHF) band.

17. The frequency conversion system of claim 14, further comprising a plurality of the frequency conversion units, wherein each of the plurality of frequency conversion units is mounted within a respective one of the plurality of slots, and wherein the one or more logical groups are at least two logical groups.

18. The frequency conversion system of claim 17, wherein a first one of the two logical groups comprises a plurality of block downconverter (BDC) units as the frequency conversion units, and wherein a second one of the two logical groups comprises a plurality of block upconverter (BUC) units as the frequency conversion units.

19. The frequency conversion system of claim 17, wherein a first one of the two logical groups comprises a plurality of block downconverter (BDC) units as the frequency conversion units, configured for a first polarization sense, and wherein a second one of the two logical groups comprises a plurality of block downconverter (BDC) units as the frequency conversion units, configured for a second polarization sense that is opposite the first polarization sense.

20. The frequency conversion system of claim 17, wherein a first one of the two logical groups comprises a plurality of block upconverter (BUC) units as the frequency conversion units, configured for a first polarization sense, and wherein a second one of the two logical groups comprises a plurality of block upconverter (BUC) units as the frequency conversion units, configured for a second polarization sense that is opposite the first polarization sense.

21. A frequency conversion system comprising:
a chassis with a plurality of slots;
a plurality of frequency conversion units, wherein each of the plurality of frequency conversion units is within a respective one of the plurality of slots, and wherein each frequency conversion unit converts a signal from a first frequency band to a second frequency band using at least one software-configurable local oscillator;
a connection matrix that provides an any-to-any connection between one or more inputs of the frequency conversion system and an input of each of the plurality of frequency conversion units, and between one or more outputs of the frequency conversion system and an output of each of the plurality of frequency conversion units; and
a controller that
for each frequency conversion unit in the plurality of slots,
configures the first frequency band and the second frequency band of the frequency conversion unit,
switches the frequency conversion unit between an online mode and an offline mode, and
monitors the operation of the frequency conversion unit to detect a failure of the frequency conversion unit, and
when detecting the failure of a first frequency conversion unit in the online mode, configures a second frequency conversion unit in the offline mode to match a configuration of the first frequency conversion unit, and switches the second frequency conversion unit to the online mode, while switching the first frequency conversion unit to the offline mode.

\* \* \* \* \*